(12) United States Patent
Bayer et al.

(10) Patent No.: US 11,132,112 B2
(45) Date of Patent: *Sep. 28, 2021

(54) SYSTEMS AND METHODS FOR RENDERING USER INTERFACE ELEMENTS

(71) Applicant: GOOGLE LLC, Mountain View, CA (US)

(72) Inventors: Jason Bayer, San Francisco, CA (US); Pierre-Yves Laligand, Palo Alto, CA (US); Leo Baghdassarian, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/814,611

(22) Filed: Mar. 10, 2020

(65) Prior Publication Data

US 2020/0210054 A1 Jul. 2, 2020

Related U.S. Application Data

(63) Continuation of application No. 16/189,695, filed on Nov. 13, 2018, now Pat. No. 10,585,572, which is a
(Continued)

(51) Int. Cl.
*G06F 3/0482* (2013.01)
*G06F 8/38* (2018.01)
(Continued)

(52) U.S. Cl.
CPC ........ *G06F 3/04842* (2013.01); *G06F 3/0482* (2013.01); *G06F 8/38* (2013.01);
(Continued)

(58) Field of Classification Search
CPC ...... G06F 3/0482; G06F 3/04842; G06F 8/38; G06F 9/44; H04N 21/41407; H04N 21/4316; H04N 21/4516
(Continued)

(56) References Cited

U.S. PATENT DOCUMENTS 6,469,719 B1 * 10/2002 Kino ..................... G06F 3/0482
715/810
7,734,299 B2 6/2010 Panabaker et al.
(Continued)

FOREIGN PATENT DOCUMENTS

CN 101036385 9/2007
CN 101047793 10/2007
(Continued)

OTHER PUBLICATIONS

Decision to Refuse a European Patent Application dated Oct. 4, 2017 in EP Patent Application No. 12819650.8.
(Continued)

*Primary Examiner* — Jacinta M Crawford
(74) *Attorney, Agent, or Firm* — Byrne Poh LLP

(57) ABSTRACT

A computer system stores information for a plurality of layouts of one or more user interface elements locally. Each layout corresponds to at least one type of display device, and includes one or more objects associated with the one or more user interface elements. Upon receiving a request for rendering a first user interface element on a display device, the computer system identifies a type of the display device and determines a first one of the at least one type of display device accordingly. The computer system then extracts information for a first layout corresponding to the first one of the at least one type of display device (e.g., information for a subset of objects that is stored with the first layout and corresponds to the first user interface element), and renders the subset of objects corresponding to the first user interface element on the display device accordingly.

20 Claims, 8 Drawing Sheets

Related U.S. Application Data continuation of application No. 15/695,867, filed on Sep. 5, 2017, now Pat. No. 10,126,926, which is a continuation of application No. 14/614,369, filed on Feb. 4, 2015, now Pat. No. 9,753,621, which is a continuation of application No. 13/556,109, filed on Jul. 23, 2012, now Pat. No. 9,013,510.

(60) Provisional application No. 61/513,511, filed on Jul. 29, 2011.

(51) Int. Cl.
*G06F 3/0484* (2013.01)
*H04N 21/414* (2011.01)
*H04N 21/431* (2011.01)
*H04N 21/45* (2011.01)
*G06F 9/44* (2018.01)

(52) U.S. Cl.
CPC ......... *G06F 9/44* (2013.01); *H04N 21/41407* (2013.01); *H04N 21/4316* (2013.01); *H04N 21/4516* (2013.01)

(58) Field of Classification Search
USPC ........................................................ 345/619
See application file for complete search history.

(56) References Cited

U.S. PATENT DOCUMENTS

| | | | |
|---|---|---|---|
| 2003/0063124 A1* | 4/2003 | Melhem | G06F 8/38 715/777 |
| 2005/0239401 A1 | 10/2005 | Nam | |
| 2006/0259942 A1 | 11/2006 | Toyama et al. | |
| 2008/0162529 A1* | 7/2008 | Stuhec | G06F 40/14 |
| 2009/0064039 A1* | 3/2009 | Lee | G11B 27/34 715/810 |
| 2010/0088532 A1 | 4/2010 | Pollock et al. | |
| 2010/0088639 A1 | 4/2010 | Yach et al. | |
| 2010/0137028 A1 | 6/2010 | Farris et al. | |
| 2010/0138780 A1 | 6/2010 | Marano et al. | |
| 2011/0131513 A1* | 6/2011 | Yamamoto | G06F 9/451 715/763 |
| 2012/0242701 A1 | 9/2012 | Ingrassia, Jr. | |

FOREIGN PATENT DOCUMENTS

| | | |
|---|---|---|
| CN | 101063928 | 10/2007 |
| CN | 102027450 | 4/2011 |
| KR | 20060038924 | 5/2006 |
| KR | 20060043083 | 5/2006 |
| KR | 20090087504 | 8/2009 |
| KR | 20090125111 | 12/2009 |
| KR | 20120087097 | 8/2012 |
| KR | 20120132648 | 12/2012 |
| KR | 20130021505 | 3/2013 |

OTHER PUBLICATIONS

Examination Report dated Apr. 6, 2016 in EP Patent Application No. 12819650.8.
Extended European Search Report dated Mar. 3, 2015 in EP Patent Application No. 12819650.8.
Friedman, Vitaly, "Responsive Web Design: What It Is and How to Use It", Smashing Magazine, last updated Jan. 12, 2011, pp. 1-49, available at:https://www.smashingmagazine.com/2011/01/guidelines-for-responsive-web-design/.
International Search Report and Written Opinion dated Dec. 20, 2012 in International Patent Application No. PCT/US2012/048105.
Notice of Allowance dated Jan. 14, 2019 in KR Patent Application No. 10-2014-7005569.
Notice of Allowance dated Apr. 27, 2017 in U.S. Appl. No. 14/614,369.
Notice of Allowance dated Jun. 27, 2018 in U.S. Appl. No. 15/695,867.
Notice of Allowance dated Oct. 2, 2018 in KR Patent Application No. 10-2014-7005569.
Notice of Allowance dated Oct. 31, 2019 in U.S. Appl. No. 16/189,695.
Notice of Allowance dated Nov. 7, 2014 in U.S. Appl. No. 13/556,109.
Office Action dated Jan. 12, 2017 in U.S. Appl. No. 14/614,369.
Office Action dated Mar. 13, 2014 in U.S. Appl. No. 13/556,109.
Office Action dated Jun. 30, 2020 in CN Patent Application No. 20170960487.1.
Office Action dated Jul. 11, 2018 in KR Patent Application No. 10-2014-7005569.
Office Action dated Sep. 5, 2017 in U.S. Appl. No. 15/695,867.
Office Action dated Sep. 29, 2016 in CN Patent Application No. 201280047371.4.
Summons to Oral Proceedings dated Jan. 19, 2017 in EP Patent Application No. 12819650.8.
Zomigi Blog, "Examples of Flexible Layouts with CSS3 Media Queries", last updated Dec. 15, 2010, pp. 1-10, available at: http://zomigi.com/blog/examples-of-flexible-layouts-with-css3-media-queries/.

\* cited by examiner

SYSTEMS AND METHODS FOR RENDERING USER INTERFACE ELEMENTS

RELATED APPLICATION

The present application is a continuation of U.S. Utility patent application Ser. No. 16/189,695, filed Nov. 13, 2018, entitled "Systems and Methods for Rendering User Interface Elements," which is a continuation of U.S. Utility patent application Ser. No. 15/695,867, filed Sep. 5, 2017, now U.S. Pat. No. 10,126,926, issued on Nov. 13, 2018, entitled "Systems and Methods for Rendering User Interface Elements in Accordance with a Device Type," which is a continuation of U.S. Utility patent application Ser. No. 14/614,369, filed Feb. 4, 2015, entitled "Systems and Methods for Rendering User Interface Elements in Accordance with a Device Type," now U.S. Pat. No. 9,753,621, issued on Sep. 5, 2017, which is a continuation of U.S. Utility patent application Ser. No. 13/556,109, filed Jul. 23, 2012, entitled "Systems and Methods for Rendering User Interface Elements in Accordance with a Device Type," now U.S. Pat. No. 9,013,510, issued on Apr. 21, 2015, which claims priority to U.S. Provisional Application Ser. No. 61/513,511, filed Jul. 29, 2011, entitled "Systems and Methods for Rendering User Interface Elements in Accordance with a Device Type." Each of the above references is hereby incorporated by reference in its entirety.

TECHNICAL FIELD

The disclosed implementations relate generally to rendering user interface elements. More particularly, the disclosed implementations relate to methods and systems for rendering user interface elements in accordance with associated device types.

BACKGROUND

Television devices (e.g., televisions and receivers coupled to televisions) have been traditionally used to access various television programs. Increasingly, non-television devices (e.g., desktop computers, notebook computers, mobile telephones, etc.), typically used for accessing other multimedia contents and information from websites and executing and displaying programs, are also being used to access television programs. Conversely, instead of just being used to receive and display television programming, television devices can also be used to access other multimedia contents and information from websites and to execute and display programs.

Non-television devices typically have screens that are smaller than television screens. In addition, television screens, when in use, are typically located further from users than the screens of the non-television devices used by respective users. Therefore, non-television devices may be configured to receive touch inputs (e.g., smart phones with touch sensitive screens) while television devices often rely on input methods other than touch inputs (e.g., remote controls). Thus, displaying user interface objects on television devices requires considerations different from displaying similar user interface objects on non-television devices.

SUMMARY

A number of implementations (e.g., of computer systems or devices, and methods of operating such systems or devices) that overcome the limitations and disadvantages described above are presented in more detail below. These implementations provide methods, systems, and graphical user interfaces (GUIs) for using rendering one or more adjustable user interface objects on a television screen.

As described in more detail below, some implementations involve a method for rendering one or more user interface elements on a display screen of a device. The method includes receiving a request for rendering a first user interface element without an orientation preference, and identifying a type of the device. The method also includes, in accordance with a determination that the type of the device is a first device type corresponding to television devices and the first user interface element corresponds to a first user interface element type, rendering the first user interface element as a vertical user interface element in a first display region of the display screen.

In accordance with some implementations, a computer system for rendering one or more user interface elements on a display screen of a device includes one or more processors, and memory storing one or more programs, for execution by the one or more processors, for rendering the one or more user interface elements on the display screen of the device. The one or more programs include instructions for receiving a request for rendering a first user interface element without an orientation preference, and identifying a type of the device. The one or more programs also include instructions for, in accordance with a determination that the type of the device is a first device type corresponding to television devices and the first user interface element corresponds to a first user interface element type, rendering the first user interface element as a vertical user interface element in a first display region of the display screen.

In accordance with some implementations, a non-transitory computer readable storage medium stores one or more programs for execution by one or more processors of a computer system coupled with a device with a display screen. The one or more programs include instructions for receiving a request for rendering a first user interface element without an orientation preference, and identifying a type of the device. The one or more programs also include instruction for, in accordance with a determination that the type of the device is a first device type corresponding to a television device and the first user interface element corresponds to a first user interface element type, rendering the first user interface element as a vertical user interface element in a first display region of the display screen.

Thus, computer systems coupled with devices are provided with improved methods for rendering user interface elements. The user interface elements are rendered in accordance with the device types, thereby enabling respective users to better utilize the display screen of the device and interact efficiently with the user interface elements.

BRIEF DESCRIPTION OF THE DRAWINGS

For a better understanding of the aforementioned implementations as well as additional aspects and implementations thereof, reference should be made to the Description of Implementations below, in conjunction with the following drawings in which like reference numerals refer to corresponding parts throughout the figures.

Like reference numerals refer to corresponding parts throughout the drawings.

DETAILED DESCRIPTION

Methods and systems for rendering user interface elements in accordance with device types are described. Reference will be made to certain implementations, examples of which are illustrated in the accompanying drawings. While the invention will be described in conjunction with the implementations, it will be understood that the implementations are not intended to limit the invention to these particular implementations alone.

Moreover, in the following description, numerous specific details are set forth to provide a thorough understanding of the described implementations. However, it will be apparent to one of ordinary skill in the art that some implementations may be practiced without these particular details. In other instances, methods, procedures, components, and networks that are well-known to those of ordinary skill in the art are not described in detail to avoid obscuring aspects of the implementations described in this document.

Figure 1:
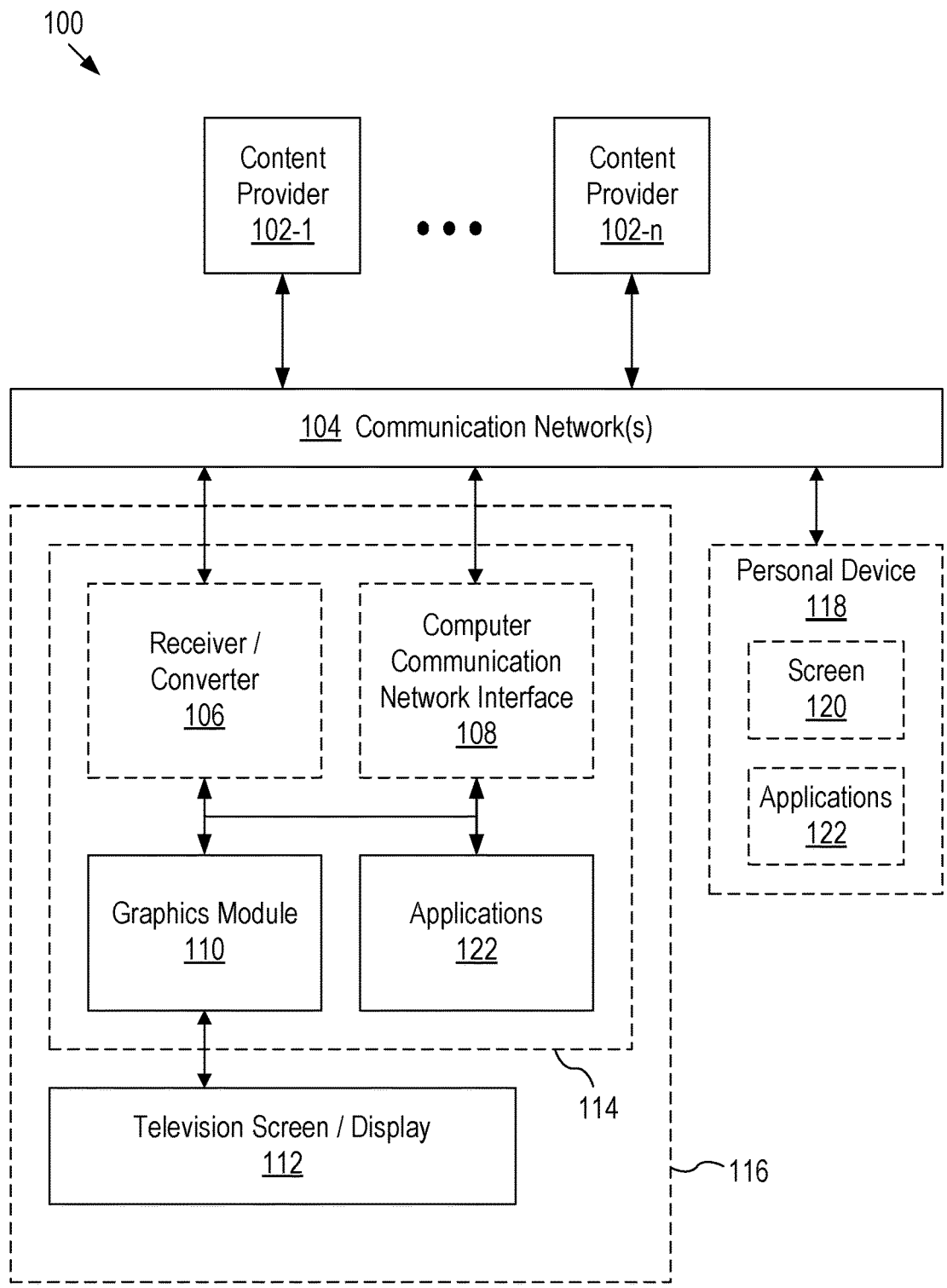
FIG. 1 is a block diagram illustrating an exemplary content distribution system, in accordance with some implementations.

FIG. 1 is a block diagram illustrating an exemplary content distribution system 100, according to certain implementations. In FIG. 1, the system 100 includes one or more content providers 102 and communications networks 104. Connected to the communication networks 104 is a companion device 114 coupled with a television screen 112 or an integrated television device 116 that includes the television screen 112 and components of the companion device 114. In some implementations, the companion device 114 is a set-top box or is a computing device that includes set-top box functionality. Various implementations of the companion device 114 and/or the integrated television device 116 implement the methods described in this document. For the purposes of this application, a television screen 112 is any large viewing screen (e.g., in some implementations, a viewing screen 26" or larger) fabricated using any suitable display technology (e.g., projection, LCD, plasma, OLED, CRT, etc.) that is intended for viewing from a distance of more than a few feet and for displaying images—commonly in response to some manner of remote control.

As used herein, content providers 102 are systems or devices configured to provide media content (e.g., music, television programs, movies, social media data, web data, etc.). The content providers 102 can be any of a number of content provider systems, equipment, and/or devices that provide media content (e.g., radio broadcasting systems, on-air television broadcasting systems, cable service systems, direct satellite broadcasting systems, Internet television service servers, Internet radio station servers, web servers, digital video recorders, etc.). In some implementations, at least a subset of the media contents distributed by the content providers 102 includes audio data (e.g., music, radio programs, television programs, movies, etc.). In some implementations, at least a subset of the media contents distributed by the content providers 102 includes video data (e.g., photos, television programs, movies, etc.). In some implementations, at least a subset of the media contents distributed by the content providers 102 includes multimedia data (e.g., television programs, movies, etc.). In some implementations, at least a subset of the media contents distributed by the content providers 102 includes user-readable text (e.g., messages sent via short message services, postings on blogs or other social networking media, web pages, etc.).

The content providers 102 distribute media contents via the communication networks 104. The communication networks 104 may include one or more of: radio-frequency communication networks used for on-air or satellite television broadcasting, radio-frequency communication networks used for on-air radio broadcasting, cable-based communication networks, digital audio/video communication networks, the Internet, other wide area networks, local area networks, metropolitan area networks, wireless networks, cellular networks, and so on.

In some implementations, the companion device 114 or the integrated television device 116 includes a receiver/converter 106 connected to the communication networks 104 and configured to receive audio and/or video signals, typically via one or more of radio-frequency communication networks and/or one or more digital audio/video communication networks.

In some implementations, the companion device 114 or the integrated television device 116 includes one or more computer communication network interfaces 108 that are configured for interfacing with one or more computer communication networks, such as the Internet, other wide area networks, local area networks, metropolitan area networks, wireless networks, cellular networks, and so on.

The companion device 114 or the integrated television device 116 stores and/or executes applications 122. The applications 122 include application programs used for managing the companion device 114 or the integrated television device 116, including, in some implementations, applications for controlling the display on the television screen of media content from one or more of the content providers 102. For example, at least one of the applications 122 is configured to receive data from the receiver/converter 106 and/or the computer communication network interface 108 and send data and instructions to a graphics module 110 for rendering media and program content, including user interfaces and/or user interface objects.

The graphics module 110 includes one or more display processors or graphics processing units for rendering user interfaces and/or user interface objects. In some implementations, the graphics module 110 receives data from the receiver/converter 106 and/or the computer communication network interface 108, and additional data or instructions from the applications 122 for rendering user interfaces and/or user interface objects. The user interfaces and/or user interface objects rendered by the graphics module 110 are sent to the television screen 112 for display. Visual characteristics of the media and program content displayed on the television screen 112 (e.g., the size and detail of particular user interfaces and/or interface objects) reflect a number of display parameters of the television screen 112, including display resolution, video resolution/pixel density, and size of the television screen 112.

As used herein, the term "resolution" of a display refers to the number of pixels (also called "pixel counts" or "pixel resolution") along each axis or in each dimension of the display. For example, a display may have a resolution of 1920×1080 pixels. Furthermore, as used herein, the term "resolution" of a device refers to the resolution of a display coupled with the device. The term "resolution" does not imply any limitations on the size of each pixel or the spacing of pixels. For example, compared to a first display with a 1920×1080-pixel resolution, a second display with a 1280× 720-pixel resolution has a lower resolution. However, because the physical size of a display depends not only on the pixel resolution, but also on many other factors, including the pixel size and the spacing of pixels, the first display may have the same, smaller, or larger physical size, compared to the second display.

As used herein, the term "video resolution" of a display refers to the density of pixels along each axis or in each dimension of the display. The video resolution is often measured in a dots-per-inch (DPI) unit, which counts the number of pixels that can be placed in a line within the span of one inch along a respective dimension of the display.

The companion device 114 or the integrated television device 116 may include additional components not illustrated in FIG. 1.

Also illustrated in FIG. 1 is a personal device 118. The personal device 118 may be any of a number of computing devices (e.g., Internet kiosk, personal digital assistant, cell phone, smart phone, gaming device, desktop computer, laptop computer, tablet computer, handheld computer, or combinations thereof) used to enable the activities described below. The personal device 118 includes a display screen 112 where a graphical user interface (GUI) can be displayed. In some embodiments, the personal device 118 is also configured to receive media content from the content providers 102 via the communication networks 104, and display the received media content.

In some implementations, the applications 122 can be executed on either or both a personal device 118 or a companion device 114, in which case the application output, including user interface elements, is presented on either the television screen 112 or the personal device screen 120. For example, an application can be an Android application that can be executed on a companion device 114 (such as a Google TV-enabled set-top box) and a smart phone/personal device 118 (such as an Android phone). This presents the challenge of providing a user-friendly user interface for an application 122 based on whether its visual outputs are displayed on a personal device screen 120, where a user may interact with user interface objects with touch inputs, or on a television screen 112, where the user may interact with user interface objects with other input means (e.g., a directional pad). For example, depending on how the user interface of an application 122 is configured, the user interface elements when displayed horizontally on a television screen 112 might be difficult to interact with (e.g., located too far away from one another). A method is described herein for providing a user-friendly user interface for applications 122 that can be executed on both device types 114, 118 by arranging particular user interface elements when di splayed on a television with particular di splay characteristics, such that the particular user interface elements are located closer to one another so that they can be more easily accessed by non-touch-based input means (e.g., a directional pad).

Figure 2:
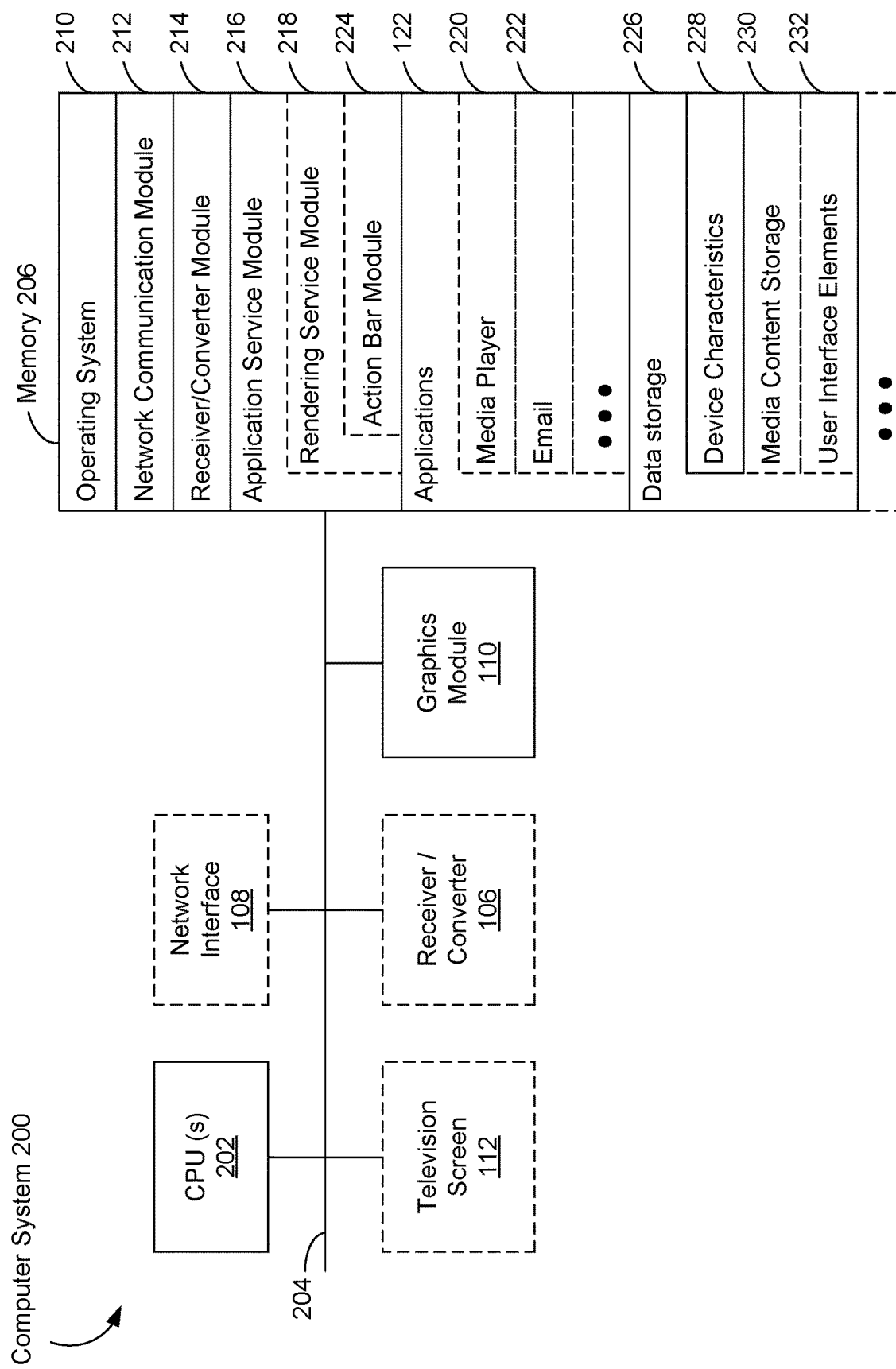
FIG. 2 is a block diagram illustrating a computer system, in accordance with some implementations.

FIG. 2 is a block diagram illustrating a computer system 200 in accordance with some implementations. In some implementations, the computer system 200 corresponds to the companion device 114 or the integrated television device 116 (FIG. 1).

The computer system 200 typically includes one or more processing units (CPUs) 202, graphics module 110, and memory 206. In some implementations, the computer system 200 also includes one or more of: one or more network or other communications interfaces 108, and one or more receivers and/or converters 106. The computer system 200 includes one or more communication buses 204 for interconnecting these components. In some implementations, the communication buses 204 include circuitry (sometimes called a chipset) that interconnects and controls communications between system components. In some other implementations, the computer system 200 includes a user interface (not shown) (e.g., a keyboard, and a mouse or other pointing device). The computer system 200 is coupled with the television screen 112, regardless of whether the television screen 112 is integrated with the computer system 200 or located outside the computer system 200. The television screen 112 may be used to display a graphical user interface.

The memory 206 of the computer system 200 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 206 may optionally include one or more storage devices remotely located from the CPU(s) 202. The memory 206, or alternately the non-volatile memory device(s) within the memory 206, comprises a non-transitory computer readable storage medium. In some implementations, the memory 206 or the computer readable storage medium of the memory 206 stores the following programs, modules and data structures, or a subset thereof:

- operating system 210 that includes procedures for handling various basic system services and for performing hardware dependent tasks;
- network communication module (or instructions) 212 that is used for connecting the computer system 200 to the content providers (e.g., content providers 102, FIG. 1) via one or more network interfaces 108 and one or more communications networks 104 (FIG. 1), such as the Internet, other wide area networks, local area networks, metropolitan area networks, wireless networks, cellular networks, and so on;
- receiver/converter module (or instructions) 214 that is used for receiving media content from the content providers (e.g., content providers 102) via one or more receivers/converters 106 and one or more communications networks 104, such as radio-frequency audio/video communication networks, cable-based communication networks, digital audio/video communication networks, and so on;
- application service module 216 that provides various services to the applications 122;
- applications 122 that include various applications executed by the one or more processing units 202 causing the computer system 200 to perform certain operations (e.g., a media player 220, which, when executed, displays contents of media data; an email application 222, which, when executed, displays one or more email messages, etc.); and
- data storage 226 that stores various data used by the computer system 200.

The data storage 226 typically includes device characteristics 228 that identify characteristics (e.g., a device type, specifications, operating modes, etc.) of the computer system 200 and/or the television screen 112. For example, the device characteristics 228 may identify that the computer system 200 is coupled with, or embedded in, the television screen 112. Alternatively, the device characteristics may identify that the computer system 200 is embedded in a personal device (e.g., the personal device 118 in FIG. 1, such as a mobile phone) or that the applications 122 are stored in the personal device.

In some implementations, the data storage 226 includes media content storage 230. The media content storage 230 may store complete media data for a particular program (e.g., a music file corresponding to an entire song, multimedia data including an entire length of a television program episode or a movie, etc.), which may be played at a time desired by a user. The media content storage 230 may store a portion of a particular program, which may be used for improving the quality of playing the particular program (e.g., for caching or for content analysis for finding related programs and/or services).

In some implementations, the data storage 226 includes user interface elements 232. In some implementations, the user interface elements 232 include information about user interface elements that are displayed in accordance with a device type. The user interface elements 232 are described in detail with respect to FIG. 4.

The application service module 216 includes one or more service modules to provide various application services (e.g., memory management, graphics rendering, etc.) to the applications 122. In some implementations, the application service module 216 is included in the operating system 210. In some implementations, the application service module 216 includes a rendering service module 218 for sending data and/or instructions to the graphics module 110 for rendering user interfaces and/or user interface objects. In some implementations, the rendering service module 218 includes an action bar module 224, which is used for rendering one or more user interface elements (e.g., an action bar) in accordance with a device type.

In some implementations, the action bar module 224 retrieves one or more parameters from the user interface elements 232 (e.g., a position and/or size of each user interface object) for rendering one or more user interface elements.

Optionally, the memory 206 may include additional applications, modules, or components. In some implementations, the computer system 200 includes additional components not illustrated in FIG. 2. For example, the computer system 200 may include one or more audio modules for generating and/or amplifying audio signals. The computer system 200 may also include a security module for protecting the data stored in the computer system 200.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various implementations. In some implementations, the memory 206 may store a subset of the modules and data structures identified above. Furthermore, the memory 206 may store additional modules and data structures not described above.

Notwithstanding the discrete blocks in FIGS. 1 and 2, these figures are intended to provide functional descriptions of some implementations rather than structural descriptions of functional elements in the implementations. One of ordinary skill in the art will recognize that an actual implementation might have the functional elements grouped or split among various components. In practice, and as recognized by those of ordinary skill in the art, items shown separately could be combined and some items could be separated. For example, in some implementations, the television screen 112 is included in the computer system 200. In other implementations, the television screen 112 is physically separated from the computer system 200. In some implementations, the CPUs 202 and the memory 206 are included in a single semiconductor package. In some implementations, the CPUs 202 and the graphics module 110 are included in a single semiconductor package. In some implementations, the computer system 200 is implemented on multiple distributed computer systems. In some implementations, the rendering service module 218 and/or the action bar module 224 are integrated into the application service module 216, and the rendering service module 218 and/or the action bar module 224 may not exist as separate modules.

The actual number of components used to implement the computer system 200 and how features are allocated among them will vary from one implementation to another, and may depend in part on the amount of data traffic that the system must handle during peak usage periods as well as during average usage periods, and may also depend on the amount of data stored by the computer system 200. Moreover, one or more of the blocks (e.g., the television screen 112, and the receiver/converter 106, etc.) in FIGS. 1 and 2 may be implemented on one or more separate devices designed to provide the described functionality. Although the description herein refers to certain features implemented in the television device and the computer system 200, the implementations are not limited to such distinctions. For example, features described herein as being part of the computer system 200 can be implemented in whole or in part in the television device, and vice versa.

FIGS. 3A-3D illustrate exemplary user interfaces displayed on a television screen 112 and a personal device 118 (e.g., a mobile phone, a tablet computer, a notebook computer, a desktop computer, etc.) in accordance with some implementations. As described above, in some implementations, the rendering service module 218 adjusts the user interface displayed on the television screen 112 such that a user interface configured for the television screen 112, instead of a user interface configured for a personal device, is displayed. It should be noted that FIGS. 3A-3D are not drawn to scale.

Figure 3A:
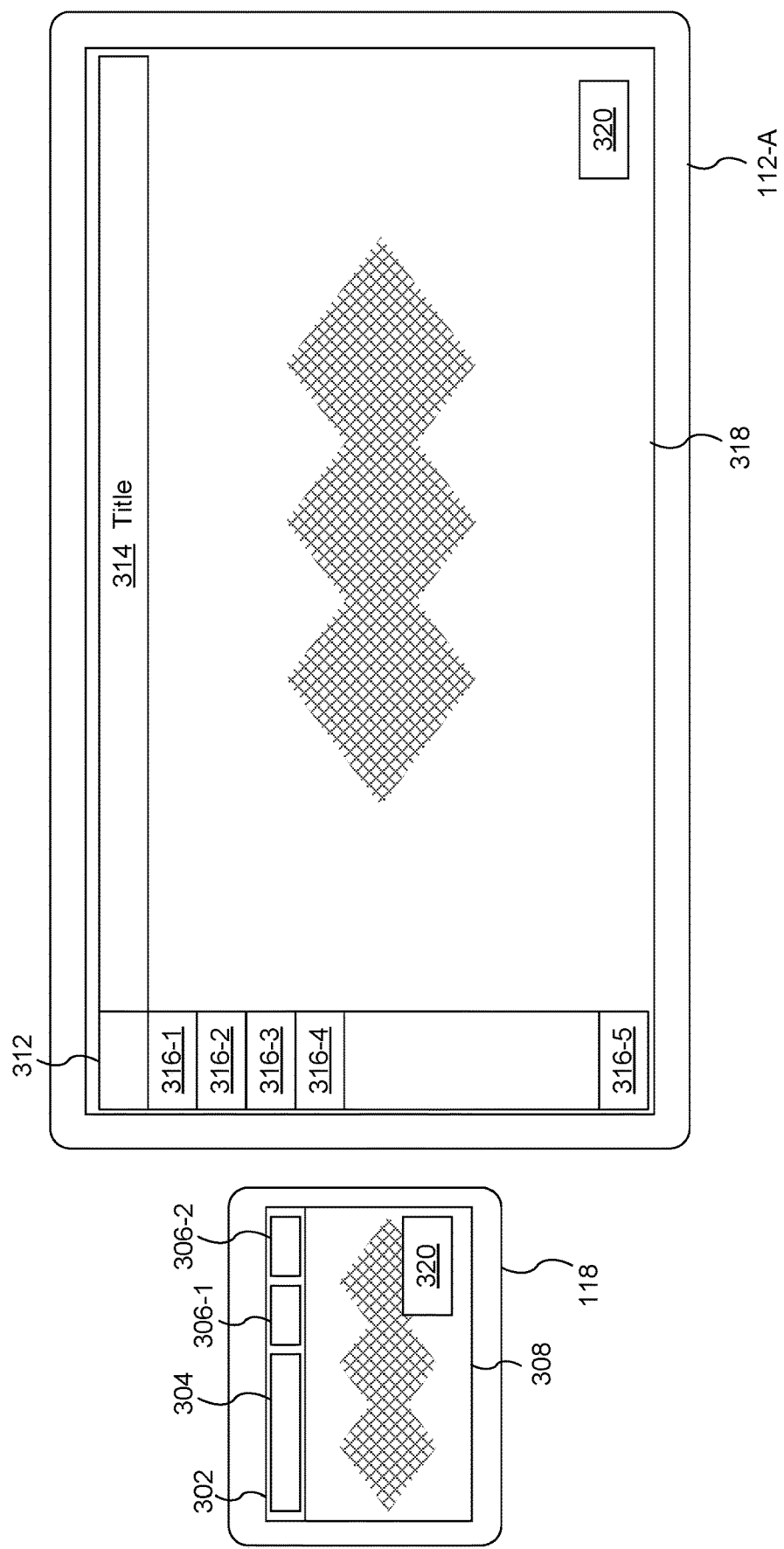
FIGS. 3A-3D illustrate exemplary user interfaces in accordance with some implementations.

In FIG. 3A, the personal device 118 displays a user interface 308 of a respective application. The personal device 118 also displays a user interface element 302. The user interface element 302 is sometimes called herein "an action bar." The user interface element 302 includes a title 304 of the respective application, and one or more user interface objects (e.g., user interface objects 306-1 and 306-2), which, when activated by a user, initiates respective operations (e.g., save, delete, search, etc.). In some cases, the personal device 118 also displays a user interface element 320, which, when activated, initiates a predefined operation (e.g., display additional information, etc.).

As used herein, the term "user interface element" refers to a user interface object, or a set of user interface objects, displayed on a display screen of a device. Exemplary user interface elements include, but not limited to, menu bars, title bars, action bars, buttons, etc.

The television screen 112-A displays a corresponding user interface 318 of the respective application. The television screen 112 also displays a user interface element 312 that corresponds to the user interface element 302 displayed on the personal device 118. The user interface element 312 includes a title 314 of the respective application, and one or more user interface objects (e.g., user interface objects 316-1 through 316-5), which, when activated by the user, initiates respective operations. In some implementations, the user interface object 316-1 corresponds to the user interface object 306-1 and the user interface object 316-2 corresponds to the user interface object 306-2. As illustrated, the user interface element 312 includes user interface objects that are not included in the user interface element 302 of the personal device 118. In some cases, the personal device 118 also displays the user interface element 320, which corresponds to the user interface element 320 displayed on the personal device 118.

It should be noted that the user interface element 302 is a horizontal user interface element (e.g., the user interface objects 306-1 and 316-2 in the user interface element 302 are positioned horizontally next to one another) and the corresponding user interface element 312 is a vertical user interface element (e.g., the user interface objects 316-1 through 316-5 in the user interface element 312 are stacked vertically). In some cases, a vertical user interface element is easier for a user to view and also to interact with, using a user input device associated with the television screen 112.

Figure 3B:
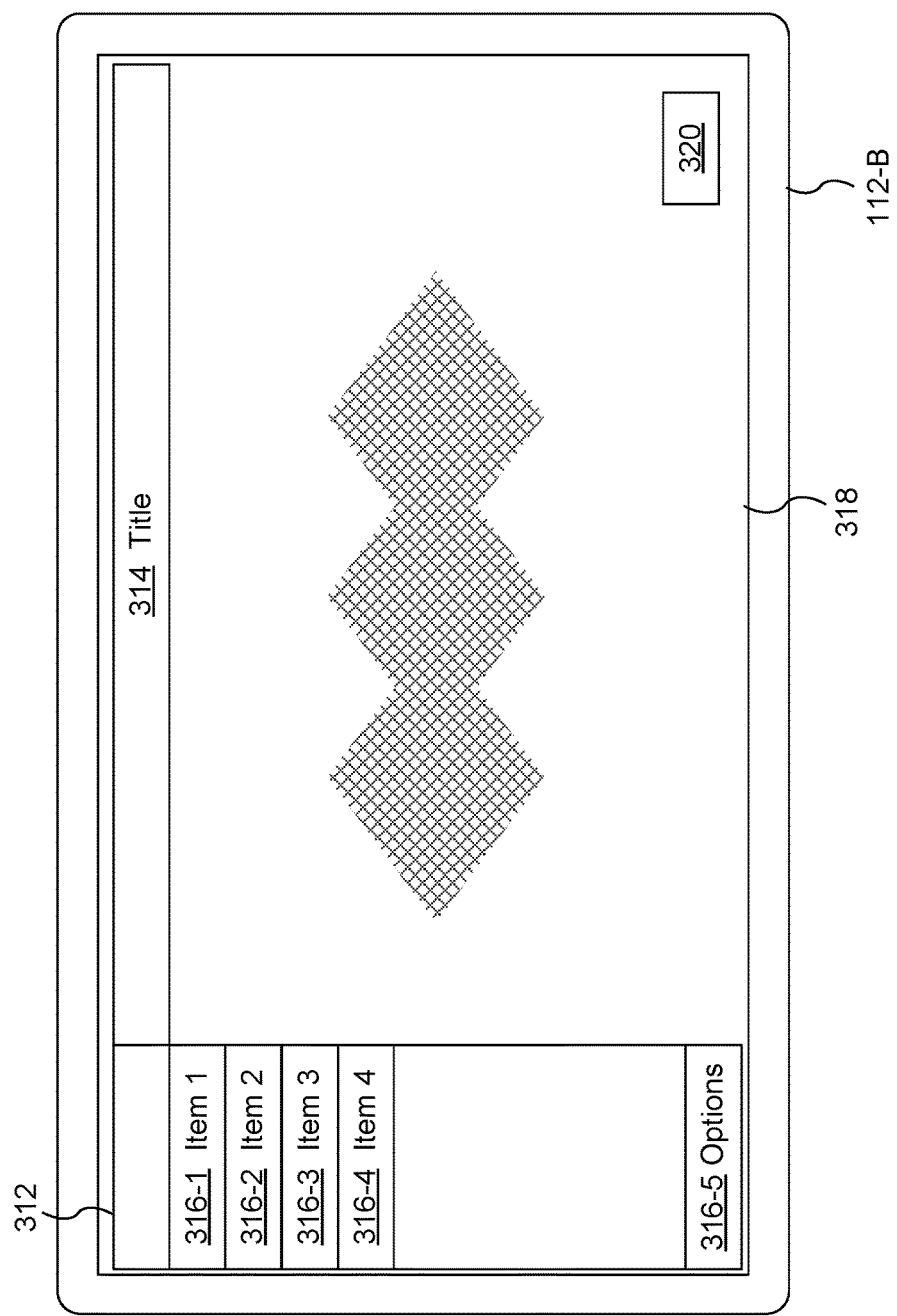
Figure 3B:
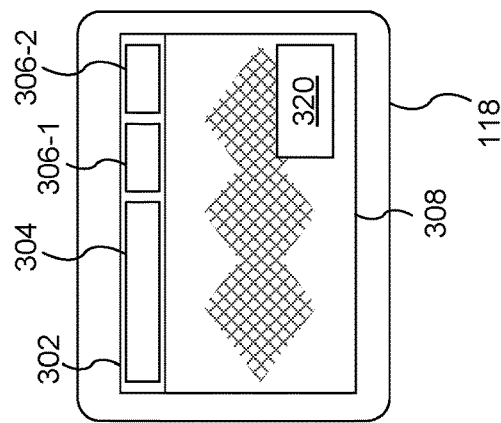

FIG. 3B illustrates an exemplary user interface displayed on the television screen 112-B in accordance with some implementations. The user interface displayed on the television screen 112-B is similar to the user interface displayed on the personal device 118. However, in FIG. 3B, the user interface element 312 includes expanded user interface objects 316. In FIG. 3B, the user interface objects 316 are rendered wider than the user interface objects 316 shown in FIG. 3A, enabling the user interface objects 316 to include additional text (e.g., a name or description of a corresponding operation).

Figure 3C:
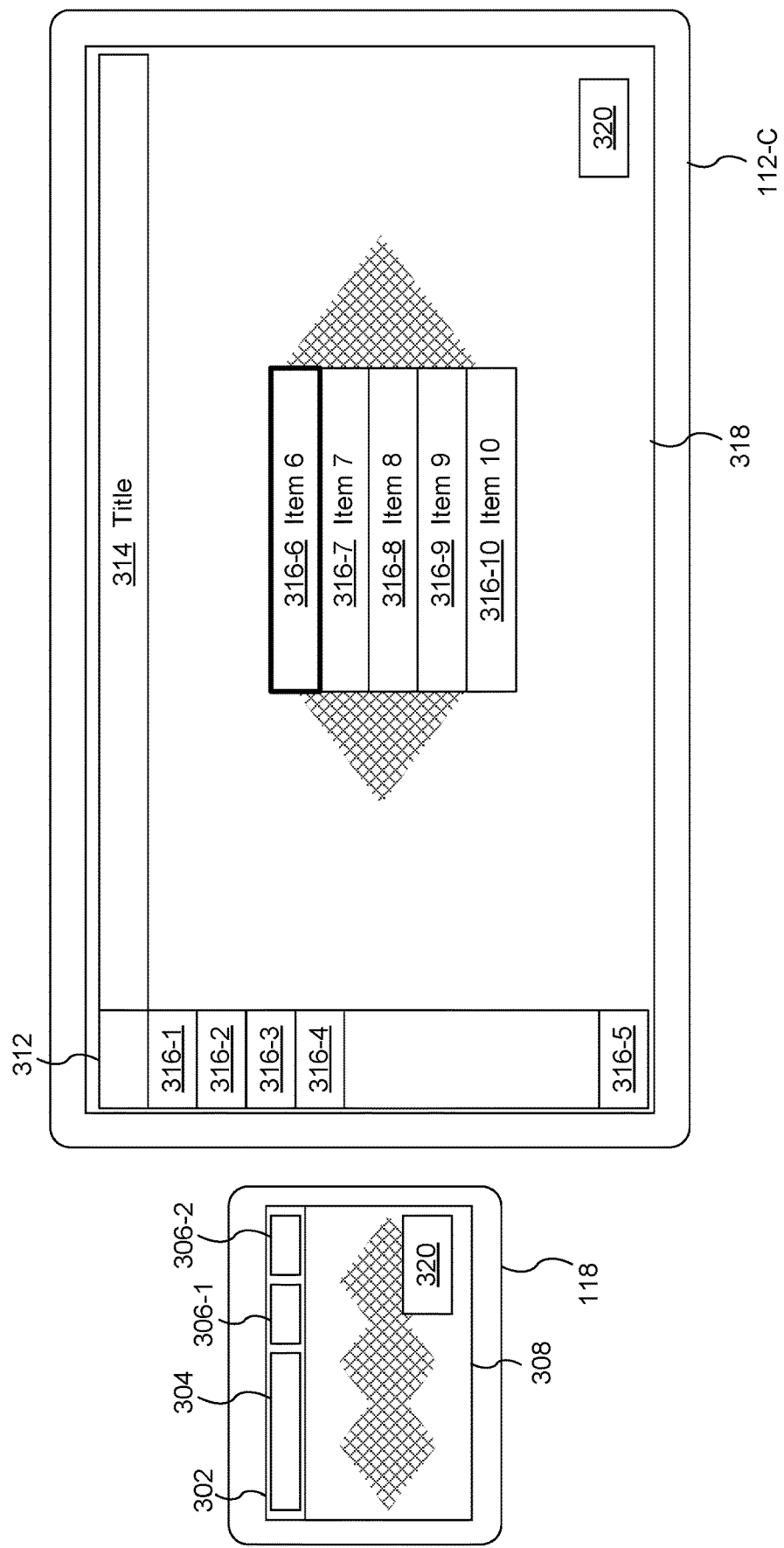

In some implementations, the user interface object 316-5, when activated by the user, initiates a display of additional user interface objects. FIG. 3C illustrates an exemplary user interface, displayed on the television screen 112-C, that includes a display of additional user interface objects 316-6 through 316-10. As shown in FIG. 3C, in response to the selection of the user interface object 316-5, the additional user interface objects 316-6 through 316-10 are displayed near a center of the television screen 112-C, in some implementations. In some implementations, the additional user interface objects 316-6 through 316-10 are rendered with a width that enables display of additional text (e.g., names or description of corresponding operations) within the additional user interface objects.

Figure 3D:
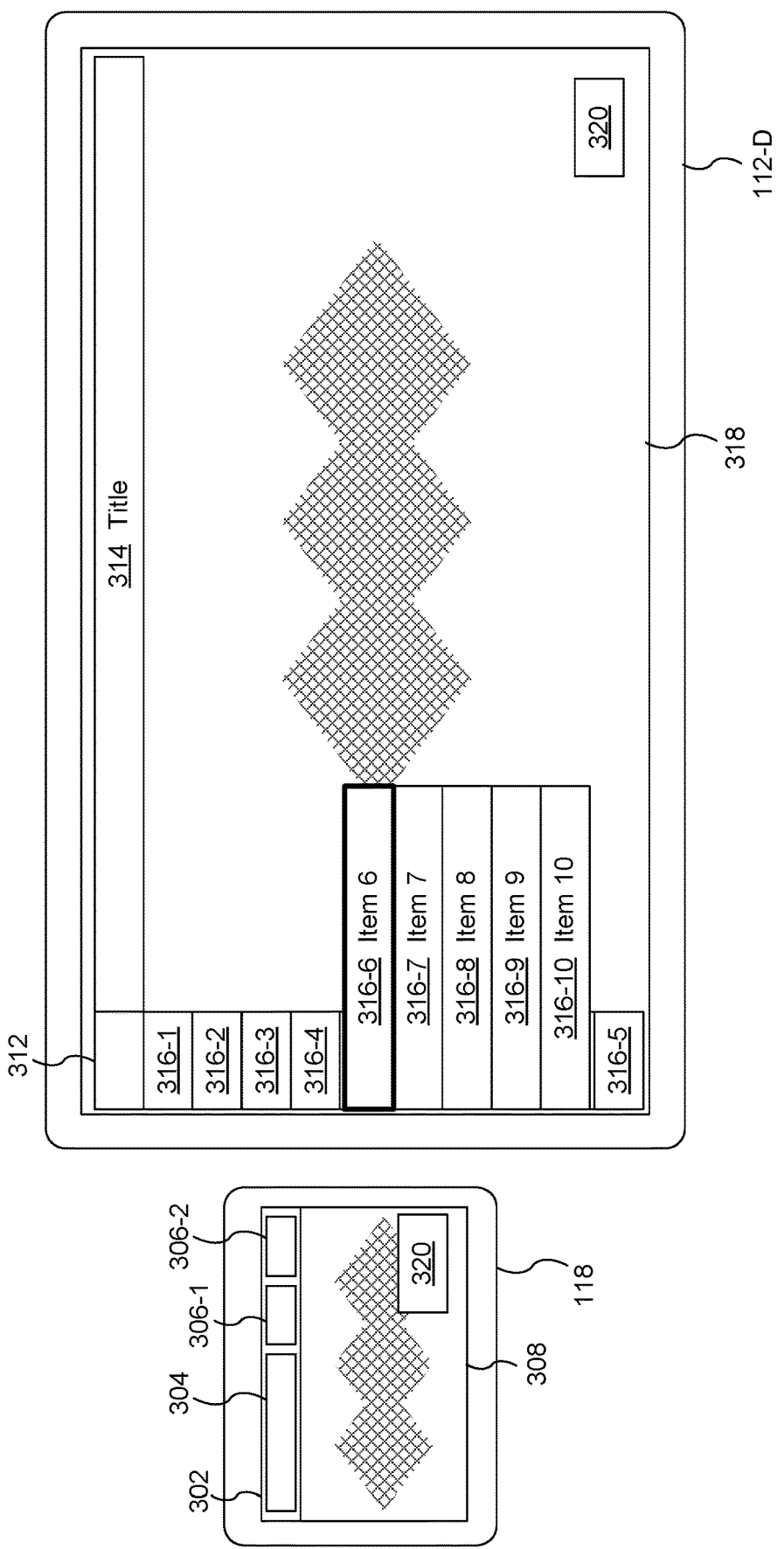

FIG. 3D illustrates another exemplary user interface, displayed on the television screen 112-D, that includes a display of the additional user interface objects. As shown in FIG. 3D, in response to the selection of the user interface object 316-5, the additional user interface objects 316-6 through 316-10 are displayed in line with the other user interface elements 316-1 through 316-5, in some implementations.

Figure 4:
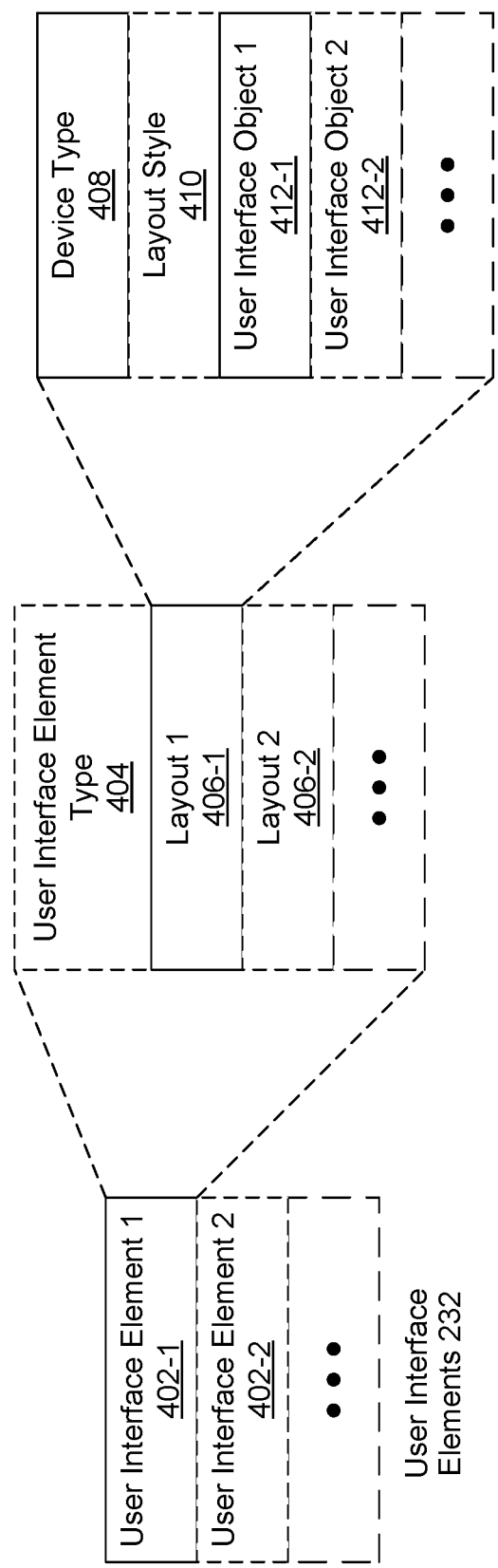
FIG. 4 is a block diagram illustrating an exemplary data structure, in accordance with some implementations.

FIG. 4 is a block diagram illustrating an exemplary data structure for the user interface elements 232 (FIG. 2), in accordance with some implementations. In some implementations, the user interface elements 232 include all user interface elements that are configured to be displayed by respective applications on a respective device (e.g., the personal device 118 as well as the companion device 114 or the integrated television device 116). In other implementations, the user interface elements 232 include one or more user interface elements 402 that are configured to be displayed by respective applications on the respective device based on a type of the respective device (e.g., whether the device is coupled to, or embedded in, a television screen, or whether the device is a personal device). For example, user interface elements that are displayed independently from the type of the respective device may not be included in the user interface elements 232 (e.g., the user interface element 320, FIG. 3A).

A respective user interface element 402-1 includes one or more layouts 406, each of which includes information for rendering the respective user interface element 402-1. For example, the respective user interface element 402-1 may include a vertical layout for rendering the respective user interface element 402-1 as a vertical user interface element, and a horizontal layout for rendering the respective user interface element 402-1 as a horizontal user interface element. In some implementations, the respective user interface element 402-1 includes a plurality of layouts, each of which corresponds to a particular device (e.g., a television screen with a first screen resolution and/or size, a television screen with a second screen resolution and/or size, etc.). Each layout 406 includes the following, or a subset or superset thereof:

a device type 408, which identifies a type of the respective device for which the respective user interface element is to be rendered (e.g., whether the respective device is coupled with, or embedded in, the television screen 112 or whether the respective device is a personal device);

one or more user interface objects 412, each of which includes one or more of: an icon to be displayed in the respective user interface element 402-1, a text to be displayed in the respective user interface element 402-1, a position and/or size of the respective user interface object, and a pointer to a corresponding operation; and (optional) a layout style 410, which identifies whether the respective user interface element 402-1 is to be displayed as a vertical user interface element or a horizontal user interface element. When user interface objects 412 in a respective layout 406 include their respective positions, the respective layout 406 need not include the layout style 410.

The user interface elements 232 may include more or fewer data fields.

In some implementations, when the user interface elements 232 include all user interface elements that are configured to be displayed on the respective device (including user interface elements that are configured to be displayed in accordance with the device type and user interface elements that are configured to be displayed regardless of the device type), the respective user interface element 402-1 includes a user interface element type 404 that identifies whether the respective user interface element is configured to be displayed on the respective device in accordance with the device type. Alternatively, the computer system 200 (FIG. 2) may determine that the respective user interface element 402-1 is configured to be displayed based on the device type when the user interface element 402-1 includes multiple layouts 406.

Figure 5:
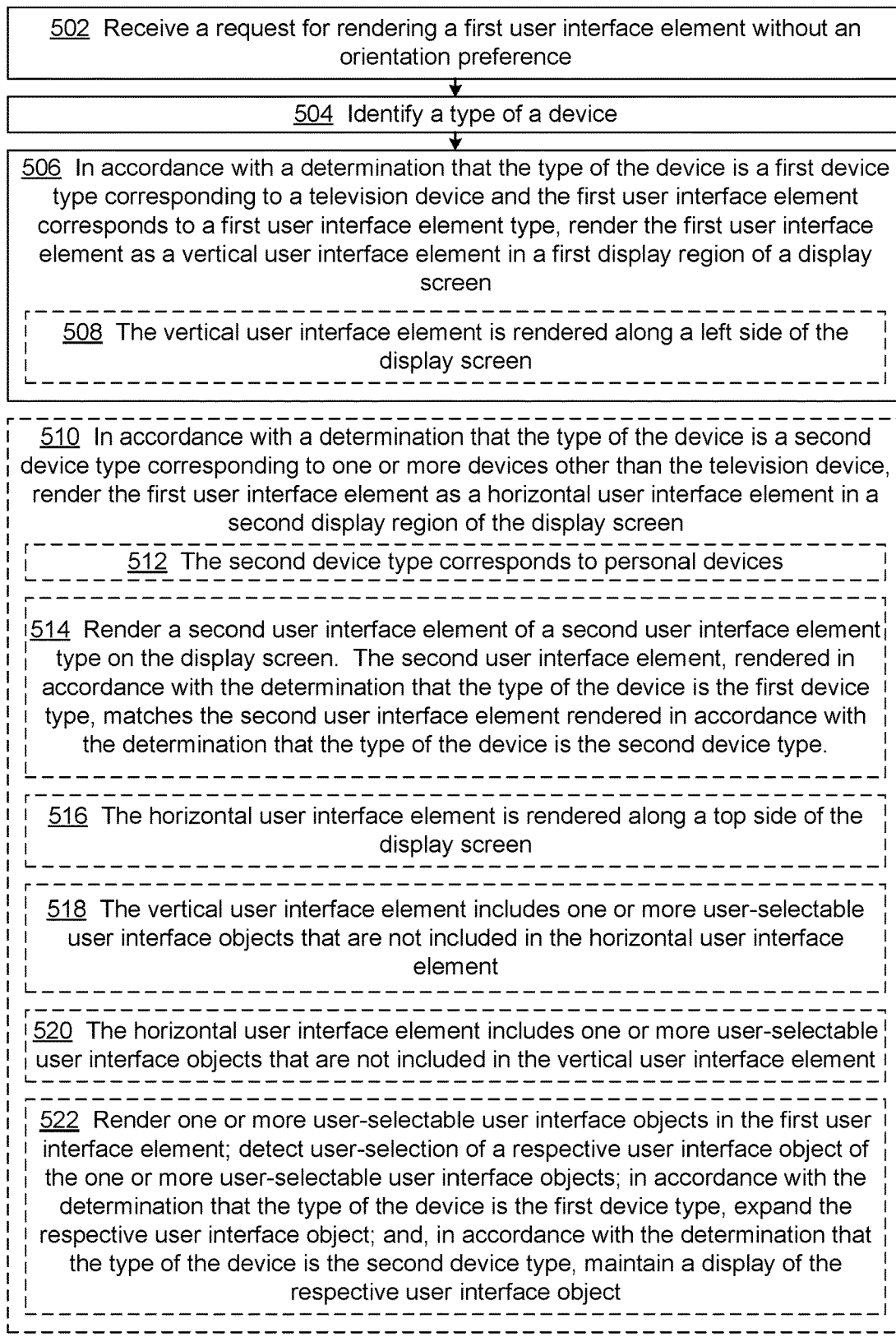
FIG. 5 is a flowchart representing a method for rendering a user interface object in accordance with a device type, in accordance with some implementations.

FIG. 5 is a flowchart representing a method 500 for rendering one or more user interface elements on a display screen of a device. The method 500 is performed at a computer system coupled with the device. For example, the computer system may be the companion device 114 coupled with a television device, or the computer system may be embedded in the integrated television device 116 (FIG. 1). Alternatively, the computer system may be the personal device 118. The computer system includes one or more processors and memory storing one or more portable programs, for execution by the one or more processors, for rendering the one or more user interface elements on the display screen. In some implementations, the action bar module 224 (FIG. 2) renders at least one of the one or more user interface elements on the display screen such that at least the one user interface element is rendered based on a layout corresponding to the device type. In some implementations, the action bar module 224 is implemented using features of the Android ActionBar API.

The system receives (502) a request for rendering a first user interface element without an orientation preference. For example, an application (e.g., the media player 220 or the email application 222, FIG. 2) sends to the application service module 216, and the system receives the request via the application service module 216. The request does not specify whether the first user interface element is to be rendered as a vertical user interface element or a horizontal user interface element.

The system identifies (504) a type of the device. For example, the system retrieves the device type information from the device characteristics 228 (FIG. 2).

In accordance with a determination that the type of the device is a first device type corresponding to television devices and the first user interface element corresponds to a first user interface element type (e.g., a tab-based user interface element), the system renders (506) the first user interface element as a vertical user interface element in a first display region of the display screen (e.g., the user interface element 312, FIG. 3A). For example, the system determines whether the device type retrieved from the device characteristics 228 matches the device type 408 for which a respective layout 406-1 (FIG. 4). In addition, the system determines whether the first user interface element is configured to be displayed as a vertical user interface element (e.g., whether the user interface elements 232 include the first user interface element) prior to rendering the first user interface element.

In some implementations, the vertical user interface element is rendered (508) along a left side of the display screen (e.g., the user interface element 312 that includes vertically arranged user interface objects 316, FIG. 3A).

In some implementations, in accordance with a determination that the type of the device is a second device type corresponding to one or more devices other than the television devices, the system renders (510) the first user interface element as a horizontal user interface element in a second display region of the display screen. For example, in accordance with a determination that the type of the device is a personal device (e.g., a mobile phone or a tablet computer), the system renders the first user interface element as a horizontal user interface element (e.g., the user interface element 302, FIG. 3A).

In some implementations, the second device type corresponds (512) to personal devices (e.g., a mobile phone, a table computer, a notebook computer, etc.).

In some implementations, the system renders (514) a second user interface element of a second user interface element type on the display screen. The second user interface element, rendered in accordance with the determination that the type of the device is the first device type, matches the second user interface element rendered in accordance with the determination that the type of the device is the second device type. For example, the second user interface element type may indicate a user interface element type that is configured to be rendered independently of the type of the device. The user interface element 320 in FIG. 3A is an example of a user interface element of the second user interface type. The user interface element 320 rendered on the television screen 112-A matches the user interface element 320 rendered on the personal device 118. For example, the user interface element 320 rendered on the television screen 112-A rendered on the television screen 112-A may have the same shape as the user interface element 320 rendered on the personal device 118, although their sizes may differ due to different resolutions, pixel sizes, and/or screen sizes of the television screen 112-A and the personal device 118.

In some implementations, the horizontal user interface element is rendered (516) along a top side of the display screen (e.g., the user interface element 302, FIG. 3A).

In some implementations, the vertical user interface element includes (518) one or more user-selectable user interface objects that are not included in the horizontal user interface element (e.g., the user interface objects 316-3, 316-4, and 316-5, FIG. 3A).

In some implementations, the horizontal user interface element includes (520) one or more user-selectable user interface objects that are not included in the vertical user interface element. For example, the user interface element 302 may include user interface objects not included in the user interface element 312 (FIG. 3A).

In some implementations, the system detects (522) user selection of the first user interface element. In accordance with the determination that the type of the device is the first device type, the system expands the first user interface element. Alternatively, in accordance with the determination that the type of the device is the second device type, the system maintains a display of the first user interface element. For example, when the user selects the user interface element 312 in FIG. 3A, the system may display the user interface element 312 illustrated in FIG. 3B. As used herein, the user selection of the first user interface element refers to a user's selection of any area within the first user interface element that does not correspond to the user interface objects included in the first user interface element. Thus, the user selection of the first user interface element does not refer to activation of any of the user interface objects included in the first user interface element. The user interface element 312 illustrated in FIG. 3B includes expanded user interface objects 316, thereby providing additional information to the user. However, when the user selects the user interface element 302 displayed on the personal device 118 (FIG. 3B), the system maintains the display of the user interface element 302 (e.g., the system does not expand the user interface element 302).

In some implementations, the system renders (522) one or more user-selectable user interface objects in the first user interface element (e.g., the user interface objects 316-1 through 316-5, FIG. 3A), and detects user selection of a respective user interface object of the one or more user-selectable user interface objects. As used herein, the user selection of the respective user interface object does not refer to an activation of the respective user interface object. Rather, the user selection of the respective user interface object refers to placing a selection indicator (e.g., a cursor or a highlight) on the respective user interface object. In accordance with the determination that the type of the device is the first device type (e.g., the device is a television device), the system expands the respective user interface object. For example, instead of displaying multiple expanded user interface objects as in FIG. 3B, the system may expand the respective user interface object only. Alternatively, in accordance with the determination that the type of the device is the second device type, the system maintains a display of the respective user interface object. However, when the user selects a respective user interface object 306-1 or 306-2 in displayed on the personal device 118 (FIG. 3B), the system maintains the display of the corresponding user interface object (e.g., the system does not expand the user interface object 306-1 or 306-2).

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

It will be understood that, although the terms first, second, etc. have been used herein to describe various elements, these elements should not be limited by these terms. These terms are only used to distinguish one element from another. For example, a first angle could be termed a second angle, and, similarly, a second angle could be termed a first angle. The first angle and the second angle are both angles, but they are not the same angle.

The terminology used in the description of the implementations herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting (the stated condition or event)" or "in response to detecting (the stated condition or event)," depending on the context.

What is claimed is:

1. A method for rendering one or more user interface elements, comprising:
    at a computer system, the computer system comprising one or more processors and memory storing one or more programs for execution by the one or more processors:
        associating a user interface element with a plurality of layouts, each layout corresponding to a device type and including one or more user interface objects associated with the user interface element;
        identifying a type of a display device coupled to the computer system;
        determining that the identified type of the display device corresponds to the device type of a first layout of the plurality of layouts;
        extracting information of the one or more user interface objects of the first layout; and
        rendering the one or more user interface objects corresponding to the user interface element on the display device according to the extracted information for the first layout.

2. The method of claim 1, wherein the computer system is integrated in the display device or locally coupled to the display device, further comprising:
    receiving a request for rendering the user interface element on the display device; and
    storing, in the memory information, for the plurality of layouts associated with the user interface element.

3. The method of claim 1, wherein the information for each of the one or more user interface objects associated with the user interface element identifies one or more of: an icon to be displayed in the user interface element, a text to be displayed in the user interface element, a position and a size of the respective user interface object, and an operation associated with the respective user interface object.

4. The method of claim 1, wherein:
    the plurality of layouts includes two distinct layouts;
    a first one of the two distinct layouts corresponds to a first television type of display devices having a first screen resolution and a first size; and
    a second one of the two distinct layouts corresponds to a second television type of display devices having a second screen resolution and a second size that are distinct from the first screen resolution and the first size, respectively.

5. The method of claim 1, wherein the plurality of layouts at least includes a vertical layout and a horizontal layout for rendering the user interface element as a vertical user interface element and a horizontal user interface element, respectively.

6. The method of claim 5, wherein:
    for each layout, the device type corresponding to the respective layout has a distinct screen resolution and a distinct size;
    the identified type of the display device corresponding to the device type of the first layout is a first device type corresponding to television devices;
    the first layout is the vertical layout; and
    the user interface element is rendered as the vertical user interface element according to the first layout.

7. The method of claim 5, wherein:
    the identified type of the display device corresponding to the device type of the first layout is a second device type corresponding to one or more personal devices distinct from television devices;
    the first layout is the horizontal layout; and
    the user interface element is rendered as the horizontal user interface element according to the first layout.

8. The method of claim 5, wherein rendering the one or more user interface objects corresponding to the user interface element includes:
    in accordance with a determination that the first layout is the horizontal layout, rendering the user interface element including the one or more user interface objects on the display device along a top side of the display device; and
    in accordance with a determination that the first layout is the vertical layout, rendering the user interface element including the one or more user interface objects on the display device along a left side of the display device.

9. The method of claim 5, wherein the user interface element, rendered in accordance with the horizontal layout, matches the user interface element, rendered in accordance with the vertical layout.

10. The method of claim 5, wherein the user interface element that corresponds to the vertical layout includes a first plurality of objects, and the user interface element that corresponds to the horizontal layout includes a second plurality of objects, and wherein the first plurality of objects include one or more user-selectable user interface objects that are not included in the second plurality of objects.

11. The method of claim 5, wherein the user interface element that corresponds to the vertical layout includes a first plurality of objects, and the user interface element that corresponds to the horizontal layout includes a second plurality of objects, and wherein the second plurality of objects include one or more user-selectable user interface objects that are not included in the first plurality of objects.

12. A computer system for rendering one or more user interface elements, comprising
one or more processors;
memory storing one or more programs for execution by the one or more processors, the one or more programs including instructions for:
associating a user interface element with a plurality of layouts, each layout corresponding to a device type and including one or more user interface objects associated with the user interface element;
identifying a type of a display device coupled to the computer system;
determining that the identified type of the display device corresponds to the device type of a first layout of the plurality of layouts;
extracting information of the one or more user interface objects of the first layout; and
rendering the one or more user interface objects corresponding to the user interface element on the display device according to the extracted information for the first layout.

13. The computer system of claim 12, wherein each layout further has a layout style identifying whether the user interface element is displayed as a vertical user interface element or a horizontal user interface element.

14. The computer system of claim 12, wherein rendering the one or more user interface objects corresponding to the user interface element further comprises:
rendering a subset of user-selectable user interface objects in the user interface element;
detecting a user selection in the subset of user-selectable user interface objects; and
expanding the selected user interface object.

15. The computer system of claim 14, wherein the selected user interface object corresponds to a list of additional user interface objects, and expanding the selected user interface object includes displaying the list of additional user interface objects at a predetermined location separately on the display device while displaying the selected user interface object.

16. A non-transitory computer readable storage medium storing one or more programs for execution by one or more processors of a computer system, the one or more programs including instructions for:
associating a user interface element with a plurality of layouts, each layout corresponding to a device type and including one or more user interface objects associated with the user interface element;
identifying a type of a display device coupled to the computer system;
determining that the identified type of the display device corresponds to the device type of a first layout of the plurality of layouts;
extracting information of the one or more user interface objects of the first layout; and
rendering the one or more user interface objects corresponding to the user interface element on the display device according to the extracted information for the first layout.

17. The non-transitory computer readable storage medium of claim 16, the one or more programs further comprising instructions for:
rendering a subset of user-selectable user interface objects in the user interface element;
detecting a user selection in the subset of user-selectable user interface objects;
in accordance with the determination that the identified type of the display device is a first device type, expanding the selected user interface object; and
in accordance with the determination that the identified type of the display device is a second device type distinct from the first device type, maintaining a display of the selected user interface object.

18. The non-transitory computer readable storage medium of claim 16, wherein the one or more user interface objects include a subset of user-selectable user interface objects, and when the user interface element is rendered as a vertical user interface element, the subset of user-selectable user interface object is configured to be accessed by non-touch-based input means associated with the display device.

19. The non-transitory computer readable storage medium of claim 16, wherein rendering the one or more user interface objects corresponding to the user interface element further comprises:
rendering the one or more user interface objects of the user interface element, independently of the identified type of the display device.

20. The non-transitory computer readable storage medium of claim 16, wherein:
the plurality of layouts at least include a vertical layout and a horizontal layout for rendering the user interface element as a vertical user interface element and a horizontal user interface element, respectively;
for each layout, a display device having the corresponding device type has a distinct screen resolution and a distinct size;
the device type associated with the horizontal layout corresponds to a television device; and
the device type associated with the vertical layout corresponds to one or more personal devices distinct from television devices.

* * * * *